United States Patent [19]

Gillard

[11] 3,916,939

[45] Nov. 4, 1975

[54] LOCKTOP FIRE HYDRANT

[76] Inventor: Clarence Gillard, c/o Schulman, Gasarch & Scheichet, P.C. 555 Madison Ave., New York, N.Y. 10022

[22] Filed: Nov. 25, 1974

[21] Appl. No.: 526,452

[52] U.S. Cl. .................. 137/296; 81/53 R; 81/125; 137/382; 192/67 R; 192/84 A; 192/84 PM; 192/95; 251/65; 251/291
[51] Int. Cl.² .................. F16K 31/06; F16K 35/06
[58] Field of Search ........... 81/53 R, 125; 192/84 A, 192/84 PM, 95; 85/9 R, 45; 251/65, 291, 292; 137/296, 382

[56] References Cited
UNITED STATES PATENTS

| | | | |
|---|---|---|---|
| 2,943,837 | 7/1960 | Noble | 251/110 |
| 3,453,897 | 7/1969 | Adinolfi | 137/296 X |
| 3,532,108 | 10/1970 | Sullivan | 137/296 |
| 3,626,961 | 12/1971 | Quinones | 137/296 |
| 3,840,041 | 10/1974 | McMurray | 137/296 |

*Primary Examiner*—Martin P. Schwadron
*Assistant Examiner*—Richard Gerard
*Attorney, Agent, or Firm*—Gottlieb, Rackman, Reisman & Kirsch

[57] ABSTRACT

A fire hydrant which can only be activated by the use of an appropriate magnetic tool is disclosed, thus precluding improper use of the hydrant by unauthorized persons. The hydrant is provided with an inverted socket which protrudes through an opening in the top of the hydrant, and with an internal control rod to which a piston is slideably attached. The piston moves only in response to a magnetic force, and when such force is applied to the socket from an external tool, the piston slides into engagement with the socket, thereby connecting the socket to the control rod and permitting activation of the hydrant.

6 Claims, 5 Drawing Figures

U.S. Patent  Nov. 4, 1975  3,916,939
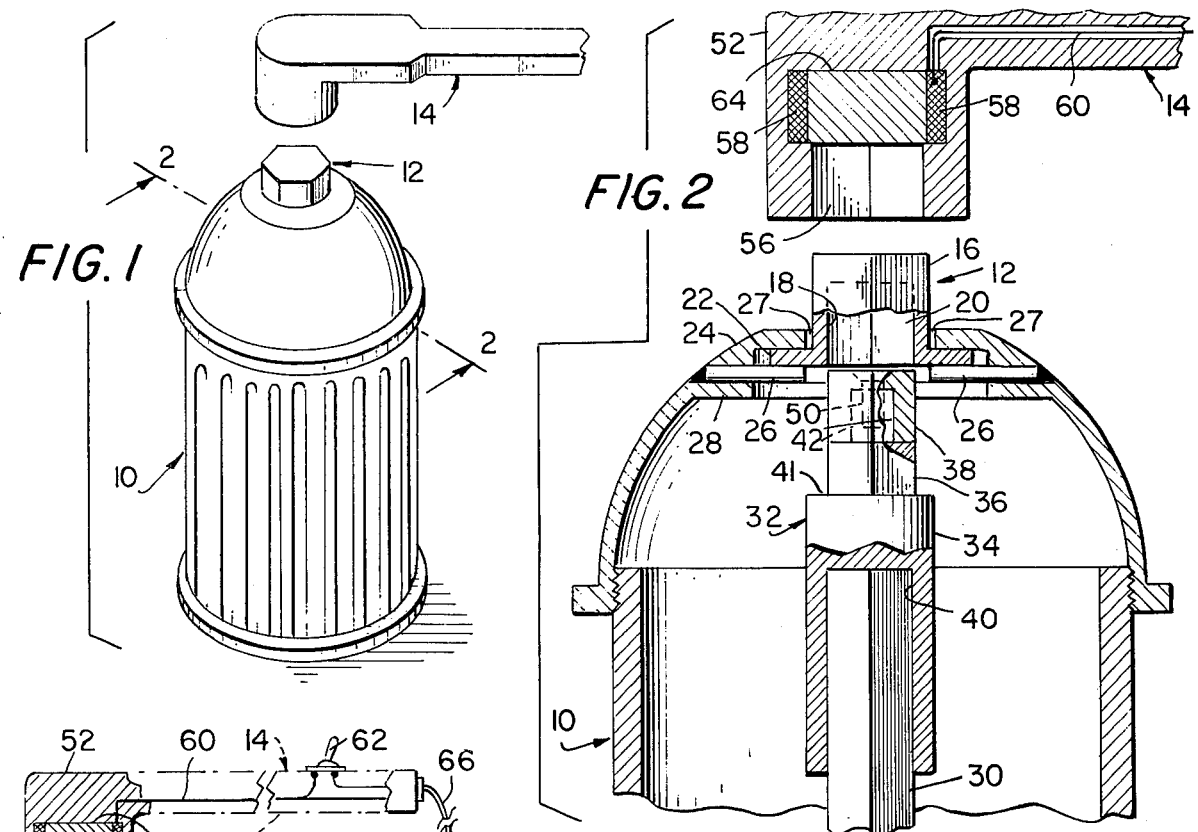
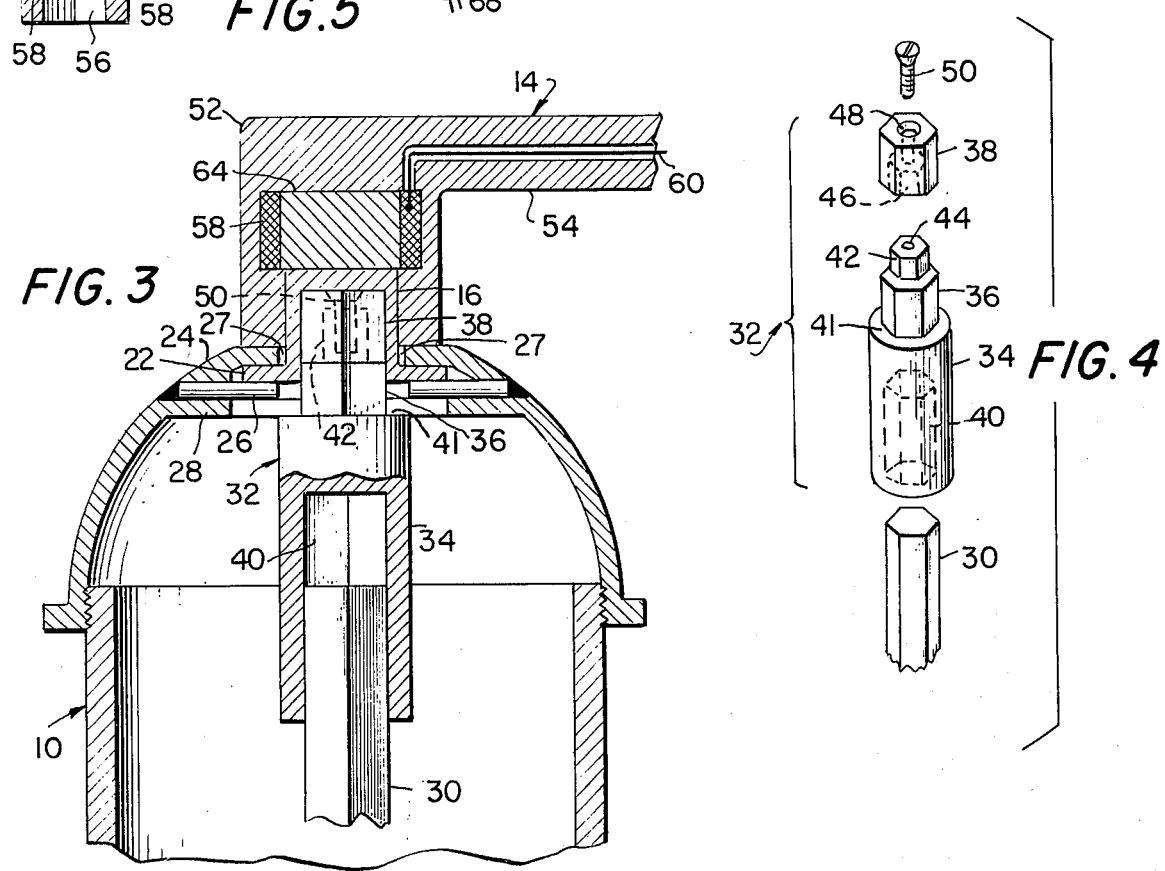

LOCKTOP FIRE HYDRANT

This invention relates generally to fire hydrants, and more specifically, to an improvement in the mechanism used to actuate such hydrants.

Most municipalities, in order to provide a readily-accessible source of water for fighting fires and for other purposes such as sanitation, have placed fire hydrants, which are connected to the water supply, at numerous locations on their streets. These hydrants are generally constructed so that a valve nut, usually hexagonal in shape, protrudes from the top of the hydrant. Rotation of the nut by any suitable means causes rotation of a control rod connected to the nut, thus opening a valve and activating the hydrant.

Since this procedure is relatively simple to accomplish with any standard type of wrench, it has become apparent in recent years that unauthorized persons, including children, are capable of operating and have operated fire hydrants with ease. This unauthorized use takes place most commonly, although not exclusively, during hot weather, and such use has resulted in a considerable waste of water as well as the potential for breakage of the hydrant mechanism. One additional result has been a significant reduction of water pressure in the locale of the illegally-operated hydrant, causing difficulties with nearby residential plumbing and seriously hampering the efforts of firemen attempting to extinguish nearby fires.

Various attempts to overcome these disadvantages have been made in the past. For example, in U.S. Pat. No. 2,943,837, a security valve-locking mechanism was proposed in which a cylindrical steel locking plug served as an obstruction to prevent unauthorized opening of a closed valve. A special removable magnetic tool was required to lift the obstruction sufficiently to allow rotation of the valve to the open position. As applied to fire hydrants, however, this mechanism would require substantial modification of all hydrants currently in use, and would not prevent unauthorized persons from turning off the water flow once it had been turned on by an authorized official bearing the appropriate tool.

In U.S. Pat. No. 3,532,108, a non-magnetic removable valve operating tool was provided for use with fire hydrants. However, in order to use this tool, it was required to alter the structure and operation of the hydrants so that downward pressure on the stem or control rod, rather than the usual rotational motion, was utilized to open the valve and activate the hydrant.

In U.S. Pat. No. 3,626,961, a magnetic hydrant lock was provided which functioned as a cover, concealing and protecting the working parts of the hydrant proper until the cover could be removed by a fireman or other authorized person who carried an electromagnet with him. Use of this invention, however, would require that a fireman who is engaged in fighting a fire first apply the electromagnet to remove the cover, and then apply a conventional socket wrench to the valve nut to activate the hydrant. This arrangement required the use of at least two separate external tools, and precious seconds would be consumed in this laborious, two-step process.

In summary, the prior art has failed to develop a mechanism for preventing unauthorized use of hydrants which successfully combines both ease and simplicity of operation by firemen and other authorized users, with a simple and inexpensive modification for the fire hydrants themselves.

It is therefore the principal object of this invention to provide an actuating mechanism for a fire hydrant which can only be operated by authorized personnel bearing the appropriate special tool.

Another object of this invention is to provide an actuating mechanism for a fire hydrant which will prevent and deter unauthorized use of rendering the hydrant inoperable to those using standard mechanical tools.

It is a further object of this invention to provide an actuating mechanism for a fire hydrant which requires only a single operation to both render the hydrant operable and to actually activate it.

Still another object of this invention is to provide an actuating mechanism for a fire hydrant which requires relatively little modification of present hydrants and fire-fighting equipment in order to put it into use.

Briefly, in accordance with the principles of this invention, there is provided an inverted socket which has a mounting flange and which may be of any suitable polygonal shape. The socket projects through the aperture at the top of a fire hydrant, and is supported by support-plates which are welded or attached by any other suitable means to the interior wall of the hydrant near its apex. Also provided is a piston which is slideably disposed on the axially-oriented control rod of the hydrant. The upper end of the piston may either incorporate a magnet or may be made of some ferrous material, such that the piston is capable of vertical movement in response to a magnetic force applied to the inverted socket from without the hydrant. Upon application of such a force, the upper end of the piston, having a polygonal shape corresponding to that of the inverted socket, is attracted to and fits within the cavity of the inverted socket. The piston thus becomes capable of imparting to the control rod any rotational force applied to the inverted socket. Use of an electromagnetic or permanently magnetic socket wrench is contemplated for attracting the piston; the socket of the wrench also has a polygonal shape, corresponding to the shape of the inverted socket, to permit mating action therebetween.

It is therefore a feature of an embodiment of this invention that a fire hydrant is provided with an internal piston which is slideably disposed on the upper end of the hydrant control rod, such piston being capable of vertical movement to thereby render the hydrant operable or inoperable, depending upon the position of the piston.

Another feature of an embodiment of this invention is that a fire hydrant is provided with a slideable internal piston, the upper end of which can be attracted by magnetic force applied to the apex of the hydrant from without, thereby causing the piston to slide vertically in response to the application or removal of such force.

Still another feature of an embodiment of this invention is that a fire hydrant is provided with a control rod, a slideable piston, and an inverted socket, all of which are of the same polygonal shape, such that, when those parts are disposed in the proper relationship, any rotational force applied to the inverted socket will be transmitted to the control rod by the intermediate piston.

Further objects, features and advantages of this invention will become more readily apparent from an examination of the following specification, when taken in conjunction with the accompanying drawing, wherein:

FIG. 1 is a perspective view of a fire hydrant, containing a preferred embodiment of this invention, above which is poised a socket wrench of the type hereinafter described;

FIG. 2 is an enlarged cross-sectional view of the interior of the hydrant, taken along the lines of 2—2 of FIG. 1 in the direction of the arrows;

FIG. 3 is a view similar to FIG. 2, but showing the detachable socket wrench engaged with the inverted socket at the top of the hydrant, and showing the internal piston drawn upward into the hollow fitting;

FIG. 4 is an exploded view of the piston, showing its internal construction and component parts; and FIG. 5 is a cross-sectional view of a preferred embodiment of an electromagnetic socket wrench for use with this invention.

Referring now to the drawing, and specifically to FIG. 1, a fire hydrant of standard construction is generally designated 10. Hydrant 10 is surmounted by a hexagonal inverted socket member 12, the structure and operation of which is described more fully hereinafter. A preferred embodiment of an electromagnetic socket wrench, indicated generally at 14, is shown elevated above hydrant 10.

Considering the views of FIGS. 2 and 3, the hexagonal inverted socket member generally designated 12 comprises an outer surface 16 and an inner surface 18, thereby forming an internal socket or cavity 20 which is hexagonally shaped in cross-section. It will, however, be appreciated that other polygonal shapes can be used, both regular and irregular. The hexagonal inverted socket member 12 is also provided with a peripheral mounting flange 22 extending outwardly from socket member 12.

Semi-circular annular support-plates 26 extend inwardly from and are attached to the wall 24 of the hydrant. Socket member 12 is disposed such that flange 22 is seated between support-plates 26 and hydrant wall 24, permitting socket member 12 to rotate freely in response to any externally-applied rotational force. It will be noted, as shown most clearly in FIG. 2, that such rotational force, if applied with any standard wrench, will not cause rotation of any part of hydrant 10 other than socket member 12, since cavity 20 is normally empty.

Support-plates 26 also provide a surface upon which socket member 12 rests, thereby assuring that socket member 12 protrudes through aperture 27 in the top of hydrant 10, and preventing socket member 12 from falling or being pushed into the interior of hydrant 10. Circumferential flange 28 provides support for plates 26.

Referring now to FIG. 4 in addition to the previously mentioned FIGS. 2 and 3, hydrant 10 is further equipped with a standard axially rotatable control rod 30 which is connected to a suitable valve arrangement (not shown) for the control of the flow of water from a water main or other supply through the hydrant to a discharge nozzle (not shown). Further details concerning the structure of the hydrant valve arrangement and its operation with respect to water flow are omitted, as they are covered by existing art. However, it is sufficient to say that rotation of control rod 30 causes activation of the hydrant.

Control rod 30 is hexagonal in cross-section, as shown most clearly in FIG. 4. Disposed above and slideably attached to control rod 30 is a piston assembly designated generally 32 (see FIGS. 2 and 3). The piston assembly 32 comprises a lower cylindrical member 34 having an intermediate hub 36 and an upper magnetic cap adapted to be mounted over hub 36. Hub 36 and the internal cavity 46 of cap 38 have corresponding cross-sections, illustratively hexagonal.

Cylinder 34 is provided at its lower end with an axial bore 40 of hexagonal cross-section, the diameter of which is slightly larger than that of control rod 30, such that control rod 30 fits snugly into bore 40, but permitting lower cylinder 34 to move slideably with respect to control rod 30. The depth of bore 40 is sufficient for cylinder 34 to move with respect to control rod 30 without being detached therefrom, as piston assembly 32 moves between the positions shown in FIGS. 2 and 3.

Hub 36 projects upward from lower cylinder 34 and is axially aligned therewith. At the upper end of hub 36 is a reduced end-portion 42, having an internally-threaded, axial circular bore 44. Upper magnetic cap 38 is, preferably, a permanent magnet with its poles appropriately oriented as hereinafter set out. However, if wrench 14 is provided with a sufficiently strong electromagnetic source, then cap 38 may be made of a suitable ferrous metal rather than magnetic material. It is provided at its lower end with a hexagonal bore 46, the diameter of which is slightly greater than the height of said end-portion 42, such that end-portion 42 fits snugly within bore 46.

Upper magnetic cap 38 is provided at its other end with an axial circular bore 48, the upper portion of which has been counter-sunk to accept bolt 50. The depth of bore 48 is sufficient to connect it with bore 46, thereby permitting bolt 50 to connect upper magnetic cap 38 with intermediate hub 36, and allow piston assembly 32 to move as a single unit (see FIGS. 2 and 3).

It will be seen that the hexagonal (or other polygonal) shape of several of the components described hereinabove permits said components to interlock in such a manner as to rotate as a unit, precluding any slippage between the components which might otherwise result if their shape were, for example, circular.

As can be seen clearly in FIG. 2, piston 32 is normally disposed immediately above control rod 30, with the upper surface of cavity 40 in contact with the upper surface of rod 30; the overall length of piston assembly 32 is such that it cannot, in this position, come into registry with cavity 20. Rotation of hexagonal inverted socket member 12 with an ordinary type of wrench will therefore not cause any corresponding activation of the hydrant, since there is no physical connection between socket member 12 and control rod 30. Thus, should a socket wrench such as 14 (or any other appropriately fitting tool) be applied over socket member 12 at this time, free rotation of member 12 will be achieved thereby. But this rotation will have no effect on the operation of the hydrant control mechanism, since no portion of piston assembly 32 will be present within cavity 20 of member 12. The relative position of piston 32 and socket member 12 is illustrated in FIG. 2, whereby a gap is present between the uppermost surface of piston 32 (the top of cap 38) and the lowermost entryway into cavity 20.

However, as seen in FIG. 3, rotation of socket member 12 after special electromagnetic socket wrench 14 (to be described in more detail hereinafter) is mounted over member 12 will cause activation of the hydrant, since the magnetic attraction between the socket wrench 14 and upper magnetic cap 38 will be of sufficient force to cause piston assembly 32 to be drawn upwardly, providing the necessary connection between socket member 12 and control rod 30. Thus, cap 38 will then be present within cavity 20, and the application of torque to wrench 14 will rotate both member 12 and the enclosed magnetic cap 38. The rotational torque will be transmitted to cylinder 34 of piston assembly 32, and thence to control rod 30 within cavity 40 of cylinder 34.

Referring now to FIG. 5 in addition to FIGS. 2 and 3, electromagnetic socket wrench 14 has a forwardly extending hub portion 52 and a rearwardly extending handle 54. Hub 52 is provided with hexagonal internal socket 56, the diameter of which is slightly larger than the outer diameter of socket member 12 of hydrant 10, such that socket wrench 14 will fit snugly over socket member 12 (see FIG. 3). Hub 52 is also provided with a coil 58 which is activated by a power source (not shown), the current being conveyed through handle 54 by wires 60. Handle 54 also has toggle switch 62 mounted on its outer surface.

Within hub 52 of wrench 14 is located coil 58 surrounding core 64 which, when current is flowing through coil 58, becomes an electromagnet of sufficient strength to attract the properlyoriented magnetic cap 38 of piston 32 as socket wrench 14 is applied to socket member 12. The proper orientation of the polarity of magnetic cap 38 would necessarily be controlled by controlling the direction of current flow in coil 58 with respect to core 64 (i.e., either in a clockwise or a counterclockwise direction). Socket wrench 14 may be connected by external wires 66, and, if necessary, by male plug 68, to any portable power source, such as, for example, the battery of a fire truck. An electromagnetic socket wrench such as the one described herein could then be made available to every fire truck and other appropriate vehicles and personnel as part of their regular equipment.

It may be seen from the foregoing that the embodiment described herein is by way of illustration and not of limitation, and that various changes in and other modifications of the construction, composition, and arrangement of parts are possible in light of the above teachings. For example, it would be possible to eliminate upper magnetic cap 38 and replace it and all of the other components of piston 32 with identically-shaped parts made of a lightweight ferrous material. In visualizing this modification, an electromagnetic socket wrench may not be necessary, since a socket wrench containing a permanent magnet could perform the desired functions equally well. Accordingly, it is to be understood that other embodiments of this invention may be utilized without departing from the spirit and scope of the present invention, as set forth in the appended claims.

What is claimed is:

1. A locking mechanism for a fire hydrant comprising an upper hydrant wall having an aperture therein, a hydrant control shaft within said hydrant, means slidably mounted on said hydrant control shaft for selectively rotating said shaft, a socket mounting rotatably disposed within said aperture and supported by said upper hydrant wall, said mounting having an internal cavity for receiving and coupling said slidably mounted means for rotation, and electromagnetic means for selectively causing said slidably mounted means to move into said cavity to permit the transfer of rotational force from said mounting to said control shaft.

2. A locking mechanism as in claim 1 wherein said slidably mounted means includes a sleeve having an interior chamber for mating with said control shaft, and a cap mounted on said sleeve and adapted for mating with said internal cavity of said mounting in response to said electromagnetic means.

3. A locking mechanism as in claim 2 wherein said cap is fabricated of permanently magnetic material.

4. A locking mechanism as in claim 2 wherein said sleeve and said control shaft have corresponding hexagonal crosssections and said cap and said internal cavity have corresponding hexagonal cross-sections.

5. A locking mechanism as in claim 1 wherein said slidably mounted means includes at least a magnetically attracted element and wherein said electromagnetic means includes a wrench having a socket cavity adapted to mate with said socket mounting, an electromagnetic coil for selectively generating an electromagnetic field when said socket mounting is received within said socket cavity to draw said magnetically attracted element into said internal cavity and a handle for applying rotational force to said socket mounting to cause the rotation of said slidably mounted means and said control shaft when said magnetically attracted element is within said socket cavity.

6. A locking mechanism as in claim 5 wherein said socket cavity and said magnetically attracted element have corresponding hexagonal cross-sections.

* * * * *